(12) United States Patent
Siew et al.

(10) Patent No.: US 9,103,323 B2
(45) Date of Patent: Aug. 11, 2015

(54) SYSTEM FOR REAL TIME SUPERVISION OF COMPONENT WEAR IN A WIND TURBINE POPULATION

(75) Inventors: Pey Yen Siew, Singapore (SG); Ingemann Hvas Sandvad, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 751 days.

(21) Appl. No.: 12/812,830

(22) PCT Filed: Jan. 15, 2008

(86) PCT No.: PCT/SG2008/000017
§ 371 (c)(1),
(2), (4) Date: Jan. 24, 2011

(87) PCT Pub. No.: WO2009/091335
PCT Pub. Date: Jul. 23, 2009

(65) Prior Publication Data
US 2011/0144949 A1    Jun. 16, 2011

(51) Int. Cl.
*G05B 23/02* (2006.01)
*F03D 1/00* (2006.01)
*G06Q 10/06* (2012.01)
*G06Q 50/04* (2012.01)

(52) U.S. Cl.
CPC ............ *F03D 1/003* (2013.01); *G05B 23/0237* (2013.01); *G05B 23/0283* (2013.01); *G06Q 10/06* (2013.01); *G06Q 50/04* (2013.01); *Y02E 10/72* (2013.01); *Y04S 10/54* (2013.01)

(58) Field of Classification Search
CPC ..... F03D 1/003; F05B 2260/80; G06Q 10/06; Y04S 10/54; Y02E 10/72; Y02E 10/722; G05B 23/02

USPC ............................................. 702/34, 183–184
See application file for complete search history.

(56) References Cited

U.S. PATENT DOCUMENTS

| | | | |
|---|---|---|---|
| 5,608,845 A * | 3/1997 | Ohtsuka et al. | 706/45 |
| 6,226,597 B1 * | 5/2001 | Eastman et al. | 702/34 |
| 2002/0174384 A1 * | 11/2002 | Graichen et al. | 714/37 |
| 2005/0033557 A1 * | 2/2005 | House et al. | 702/184 |
| 2006/0070435 A1 * | 4/2006 | LeMieux et al. | 73/168 |
| 2007/0101178 A1 * | 5/2007 | Jammu et al. | 714/4 |

OTHER PUBLICATIONS

Bell, Benjamin. Wind Turbine Realiability and Service Improvements, Oct. 3, 2006, pp. 1-24.*
Tavner, P.J et al., Reliability of Different Wind Turbine Concepts with Relevance to Offshor Application, Apr. 2008, European Wind Energy Conference, pp. 1-9.*
Hill, Roger R. et al., Wind Turbine Reliability: A Database and Analysis Approach, Feb. 2008, Sandia National Laboratories, Sandia Report SAND2008-0983, pp. 1-72.*
Bedford, Tim & Cooke, Roger,"Probabilistic Risk Analysis Foundations and Methods", 2001, Cambridge University Press, pp. 83-85.*

* cited by examiner

*Primary Examiner* — Mischita Henson
(74) *Attorney, Agent, or Firm* — Patterson & Sheridan, LLP

(57) ABSTRACT

A system for scheduling maintenance of a component in a wind turbine. The system receives signals from each of the wind turbines in a population of wind turbines. From the signals, the system detects a failure of the component in one of the wind turbine. In response to the detect failure, the system calculates a new life value for the component. The life value is then compared to a threshold value. If the life value is within a specified parameter compared to the threshold value, the system schedules a change of the component in all of the wind turbines in the population.

36 Claims, 7 Drawing Sheets

SYSTEM FOR REAL TIME SUPERVISION OF COMPONENT WEAR IN A WIND TURBINE POPULATION

CROSS-REFERENCE TO RELATED APPLICATIONS

This application is a National Phase Application of PCT International Application No. PCT/SG2008/000017, International Filing Date Jan. 15, 2008, which is incorporated by reference herein.

FIELD OF THE INVENTION

This invention relates to supervision of a population of wind turbines. More particularly, this invention relates to determining when to replace a component in all of the wind turbines in a population to reduce unscheduled maintenance of the wind turbines.

BACKGROUND OF THE INVENTION

As the world has looked for alternative energy sources to replace fossil fuel, one solution has been the use of wind turbines to generate electrical power. One problem with the use of wind turbines for power generation is maintaining the turbines to prevent power disruptions due to failure of the components in the turbines. Most wind turbines are located in wind parks with multiple turbines. These wind parks are often situated in remote areas to take advantage of prevalent weather patterns in the area. In these remote areas, the wind turbines are often exposed to extreme environmental conditions. These extreme environmental conditions include, but are not limited to, extreme temperatures, rain, snow, blowing debris, and rough seas.

There are two problems associated with placing the wind parks in these remote locations. The first is the aforementioned extreme environmental conditions. This may cause premature failure of components in the turbines. The second problem is that inspection and maintenance of the wind turbines is difficult and often times expensive to complete. Therefore, those skilled in the art are constantly striving to find ways to minimize the amount and frequency of on site inspections and maintenance while keeping a maximum number of wind turbines operational.

In the past, those skilled in the art have focused on optimizing failure detection of a component in the wind turbines. Some skilled in the art have observed that components of wind turbines in the same area typically have a similar pattern for wear of components. Thus, identical components in different wind turbines in the same wind farm are subjected to the same environmental conditions tend to have a similar life cycle. For purposes of this discussion, a component is any system and/or sub-system in a wind turbine that performs an operation in the wind turbine. Further, life cycle means the time during which the component is operating within defined parameters.

Those skilled in the art have observed that a life cycle for a component has three periods. The three periods are an infant mortality period, a random failure period, and a wear-out period. The infant mortality period is the time period during handling and installation of the component; and up to the time of commission of the turbine during which installation and handling of a component can cause failure. After commission of the turbine, the component enters a random failure period during which some random event may cause failure of the component. Finally, sometime later, the component enters a wear-out period that is the time period during wear and age cause the component to fail. Since wind turbines in a same wind park are subjected to the same conditions, the life cycle for identical components in different turbines should be approximately the same. Thus, those skilled in the art are constantly striving to lengthen the random failure period of an identical component of wind turbines in a park to avoid failures of multiple turbines at the same time.

SUMMARY OF THE INVENTION

The above and other problems are solved and an advance in the art is made by a system for real-time monitoring of component wear in accordance with the present invention. A first advantage of a system in accordance with the present invention is that the system can predict wear-out of a particular component to allow maintenance of the component in all wind turbines in a population to reduce unscheduled failures of the turbines. For purposes of this discussion, population is a wind park including multiple wind turbines, or multiple turbines placed in the same or similar environments. A second advantage of a system in accordance with this invention is that maintenance of the component in each of the wind turbines in the population is economical in that the maintenance is completed at the same time reducing travel to the remote site to a one time occurrence. This one time maintenance saves travelling and installation costs. Further, the number of failures of turbines in a population is reduced which in turn reduces the amount of revenue lost from inoperable turbines. A fourth advantage in accordance with the present invention is the reduction of wear on other components by a failing component in all of the wind turbines of a population thus further improving efficiency and reducing failure of each of the turbines.

A system in accordance with the present invention operates in the following manner to schedule maintenance of an identical components in wind turbines in a population. The system begins by receiving an indication of a failure in a component in one of the wind turbines in the population. In response to receiving an indication of a failure, the system calculates a life value for the failure. In some exemplary embodiments, the life value may be a cumulated number of failures in a given time. In other exemplary embodiments, the life value is calculated using a Weibull distribution. In some of these exemplary embodiments, the Weibull distribution has variables including failure rate, failure time, shape parameter, and scale parameter.

Once the life value is calculated, the life value is compared to a threshold value. In some embodiments, the threshold value is a certain number of failures in a given amount of time. In the embodiments using a Weibull distribution, the threshold value may be one. If the life value is within specified criteria when compared to the threshold value, maintenance of the component in each of the wind turbines in the population is scheduled. Otherwise, the system returns to monitoring the population by receiving signals from the turbines In some embodiments, the system receives signals from each wind turbine. These signals may indicate a property of the particular wind turbine indicating the condition of a component. In other embodiments, the signal may indicate a property of the component in the particular wind turbine indicating the condition of the component. In still other embodiments, the signal may indicate a property of a sub-component of the component which indicates the condition of the component.

In response to receiving the signals, the system detects any failures of the component in any of the turbines. In some embodiments, the detection is completed by determining a system value from the signal. The system value is a value indicating a condition of a component. The system value is then compared to a system threshold value. If the system value is within some specified criteria compared to the system threshold value, a failure of the component is indicated.

BRIEF DESCRIPTION OF THE DRAWINGS

The above features and advantages are described in the following Detailed Description and are shown in the following drawings.

DETAILED DESCRIPTION

Figure 1:
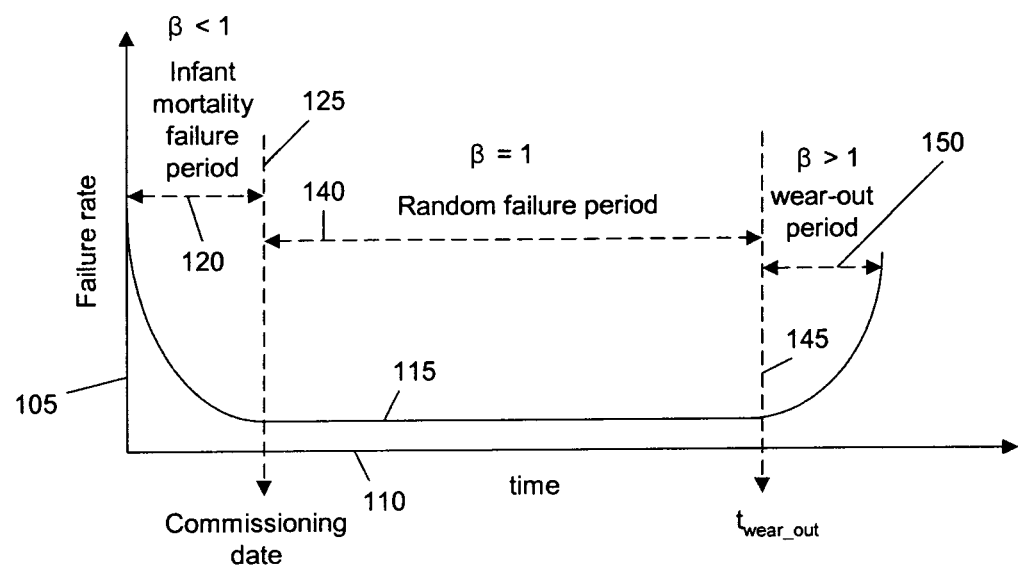
FIG. 1 illustrating a life cycle of identical components in a population of wind turbines.

This invention relates to supervision of a population of wind turbines. More particularly, this invention relates to determining when to perform maintenance on a component in all of the wind turbines in a population to reduce unscheduled maintenance of the wind turbines. For purposes of this discussion, maintenance may mean to repair, refurbish, clean, and/or replace the component. Further, same components described on different drawings are given the same reference numeral through the description. Furthermore, the exemplary embodiments described provide examples of a system in accordance with this invention that are not intended do not limit the scope of this invention as set forth in the following claims.

FIG. 1 illustrates a typical life cycle for a component in each wind turbine of a population. Vertical axis 105 is the rate of failure of the component in wind turbines and horizontal axis 110 is the life time of the component. The life cycle of the component has three periods. The three periods are infant mortality period 120, random failure period 140, and wear-out period 150. Infant mortality period 120 is the time period during handling and testing of the component to the time of commission of the turbine for use at line 125. During the infant mortality period, handling and installation of a component may cause failures of the component. After commission of the turbine, at the time represented by line 125, the component enters a random failure period denoted by line 140. During the random failure period, random events may cause failure of the component. Finally, sometime later the component enters a wear-out period denoted by line 150 at the time denoted by line 145. During the wear out period, wear and age may cause the component to fail. Since wind turbines in a population are subjected to substantially the same conditions, the life cycle for identical components in different turbines is substantially the same.

A Weibull distribution is one of the most widely used lifetime distribution models. In a Weibull distribution, a shape parameter, 13 also known as the slope describes the behaviour of the distribution. The shape parameter is herein referred to as a life value. The life value is less than 1 during the infant mortality period, is equal to 1 during the random failure period, and is greater than one during the wear-out period. Thus, the life value is a good indicator of the period that a component is experiencing when using the Weibull distribution. A more complete description of the Weibull distribution is provided below.

The object of the present invention is to monitor a population of wind turbines to determine when a component of the turbine has entered the wear-out period of the life cycle and to perform maintenance on the component in all wind turbines prior to or at approximately the start of the wear-out period. This extends the life cycle of the component to maintain the operability of the wind turbines in the population.

Figure 2:
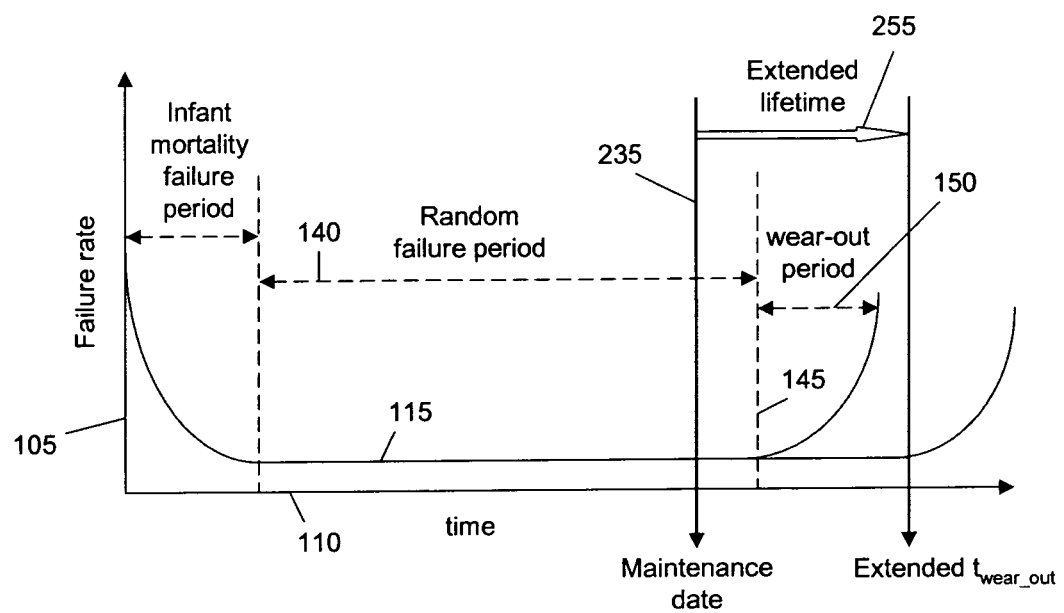
FIG. 2 illustrating a life cycle of identical components in a population of wind turbines maintained by a system in accordance with this invention.

FIG. 2 illustrates the results of using a maintenance system in accordance with the present invention. In FIG. 2, maintenance of the component occurs at a time proximate the beginning of the wear-down period of component shown by line 235. This maintenance of the component extends a lifetime denoted by line 255 by lengthening the random failure period of the component by the amount of the extended lifetime. One skilled in the art will note that although one extension is shown, multiple maintenances may be made further extending the random failure period of the component.

Figure 3:
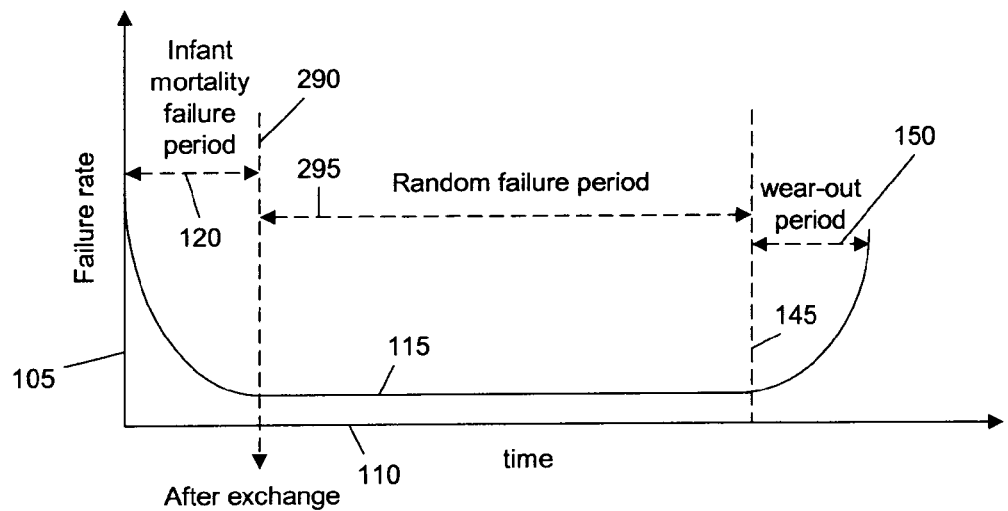
FIG. 3 illustrating a diagram of a life cycle when a component is replaced prior to a wear-out period determined by a system in accordance with this invention.

FIG. 3 illustrates the results of using another exemplary embodiment of a maintenance system in accordance with the present invention. In this embodiment, the maintenance performed is the replacement of the component in each of the wind turbines in the population. As shown, in FIG. 3, after the component is replaced or exchanged at the time indicated by line 290, the component enters random failure period 295. Therefore, the component stays in a random failure period of the life cycle. This reduces the amount of repair and maintenance needed in the wind turbines of the population as the components are prevented from reaching the wear-down period of the life cycle.

Figure 4:
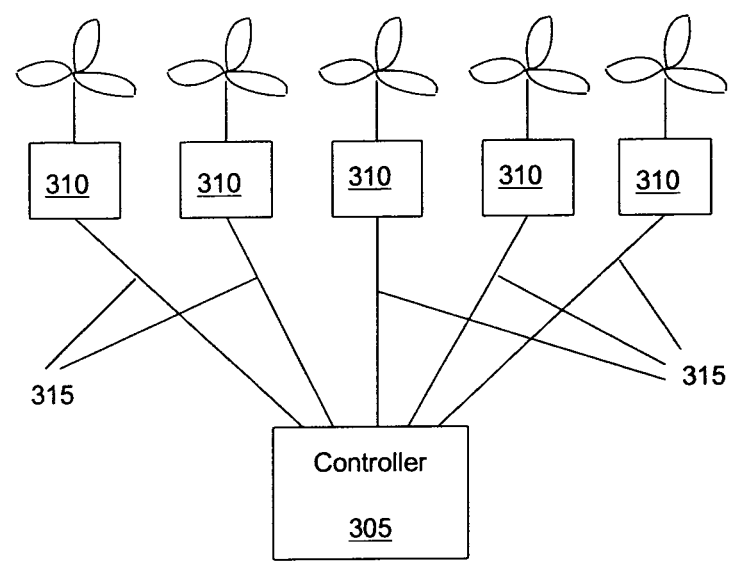
FIG. 4 illustrating a population of wind turbines and a control system in accordance with an exemplary embodiment of this invention.

FIG. 4 illustrates an example of a population 300 that incorporates a monitoring system in accordance with this invention. Population 300 includes wind turbines 310 that are situated in a wind park proximate one another or within the same geographical area or in similar environments. Wind turbines 310 are conventional wind turbines for power generation and the exact components of the individual turbines are inconsequential to the present invention and therefore are omitted for brevity. Although this example has a population that transmits signals from remote areas to a central location, it is envisioned that other failure reporting methods may be used including but not limited to a human technician inputting a report of a failure into the system.

Each wind turbine 310 transmits signals over a connection 315 to a system controller 305. Connection 315 may be any transmission medium including but not limited to Radio Frequency (RF), Infrared (IR), Telephonic, or any other form of communication connection. Each wind turbine 310 includes monitoring devices that measure a property of either the wind turbine, a component of the wind turbine, or a sub-component of the component of the wind turbine. This property can be used to determine the condition of the component to indicate a failure of the component. In some embodiments, the signal may be simple failure signal or a message indicating failure of the component. In other embodiments, the signal may be a message transmitting data for the property measured by the monitor. Furthermore, the protocol in which data is transmitted over connection 315 is not important to this invention and is left as a design choice.

The signal is then transmitted via connection 315 to system controller 305. System controller 305 is processing system that is located either at or in the population or at some facility remote from the population of wind turbines 310. The precise location of system controller 305 is not important to the operation of the system and is left as a design choice for those skilled in the art.

Figure 5:
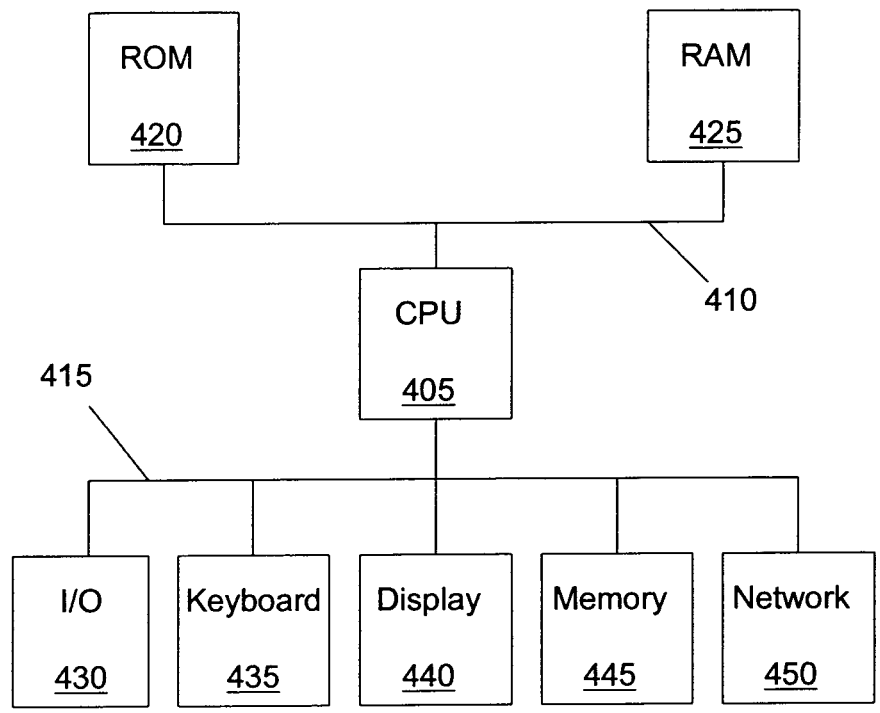
FIG. 5 illustrating a processing system such as one included in the control system and other devices in accordance with an exemplary embodiment of this invention.

FIG. 5 illustrates a processing system 400 representative of system controller 305 and includes the components of a processing system needed to perform the processes of a system in accordance with this invention. One skilled in the art will recognize that the exact components of the system are left to those skilled in the art designing a system in accordance with this invention and that other components that perform the same functions may be used without departing from the system in accordance with this invention. Furthermore, one skilled in the art will recognize that other embodiments that include the processes embodied in software, firmware or hardware are possible without departing from this invention.

Processing system 400 includes Central Processing Unit (CPU) 405. CPU 405 is a processor, microprocessor, or any combination of processors and microprocessors that execute instructions to perform the processes in accordance with the present invention. CPU 405 connects to memory bus 410 and Input/Output (I/O) bus 415. Memory bus 410 connects CPU 405 to memories 420 and 425 to transmit data and instructions between the memories and CPU 405. I/O bus 415 connects CPU 405 to peripheral devices to transmit data between CPU 405 and the peripheral devices. One skilled in the art will recognize that I/O bus 415 and memory bus 410 may be combined into one bus or subdivided into many other busses and the exact configuration is left to those skilled in the art.

A non-volatile memory 420, such as a Read Only Memory (ROM), is connected to memory bus 410. Non-volatile memory 420 stores instructions and data needed to operate various sub-systems of processing system 400 and to boot the system at start-up. One skilled in the will recognize that any number of types of memory may be used to perform this function.

A volatile memory 425, such as Random Access Memory (RAM), is also connected to memory bus 410. Volatile memory 425 stores the instructions and data needed by CPU 405 to perform software instructions for processes such as the processes for providing a system in accordance with this invention. One skilled in the art will recognize that any number of types of memory may be used to provide volatile memory and the exact type used is left as a design choice to those skilled in the art.

I/O device 430, keyboard 435, Display 440, memory 445, network device 450 and any number of other peripheral devices connect to I/O bus 415 to exchange data with CPU 405 for use in applications being executed by CPU 405. I/O device 430 is any device that transmits and/or receives data from CPU 405. Keyboard 435 is a specific type of I/O that receives user input and transmits the input to CPU 405. Display 440 receives display data from CPU 405 and display images on a screen for a user to see. Memory 445 is device that transmits and receives data to and from CPU 405 for storing data to a media. Network device 450 connects CPU 405 to a network for transmission of data to and from other processing systems.

Figure 6:
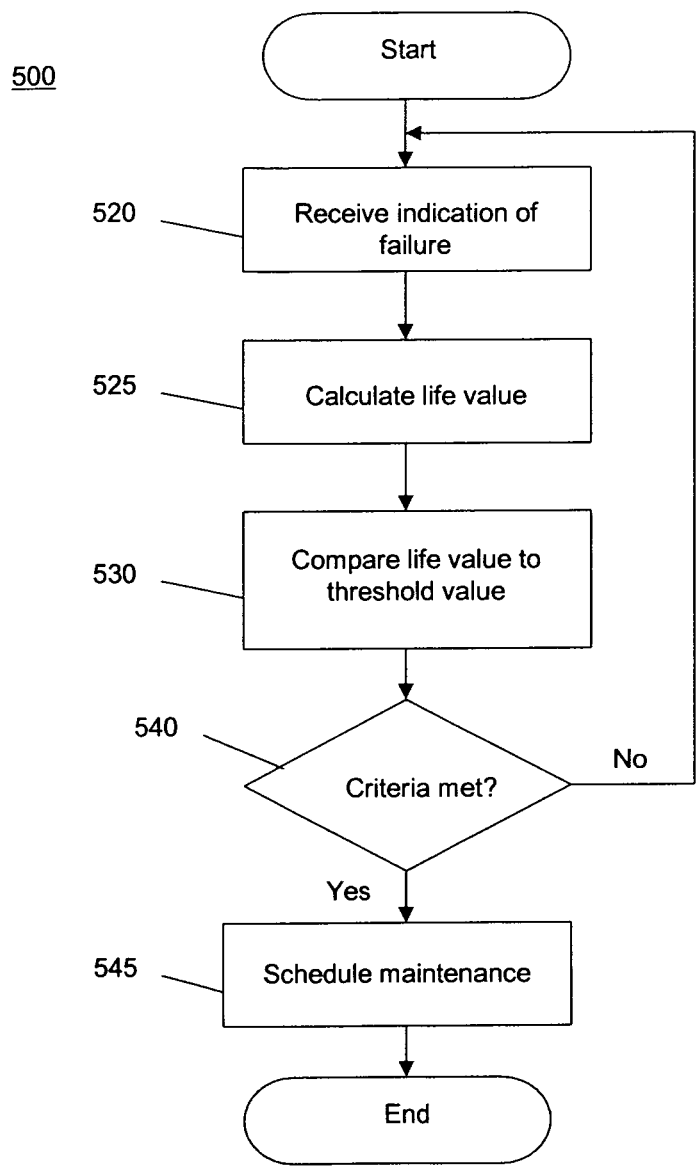
FIG. 6 illustrating a flow diagram of an exemplary embodiment of a scheduling process performed by a control system in accordance with this invention.

An exemplary embodiment of a process for providing a maintenance system in accordance with the present invention is shown in FIG. 6. Process 500 begins in step 520 when an indication of a failure is received. An examples of an indication include, but are not limited to, an input from a user; a report generated by another process; and a signal from a wind turbine, component of the turbine, or a sub-component of the component.

Controller 305 then calculates a new life value for the component in step 525. The life value is a value used to quantify the life cycle of the component in question normally referred to as the shape variable. In some embodiments, it is envisioned the life value may be as simple as a number of failures in a given time period. In one exemplary embodiment, the life value is derived from a Weibull distribution. Specifically, the cumulative density function of a two variable Weibull distribution is:

$$F(t)=1-e^{-(T/C)^\beta}$$

Where:
F(t) is failure rate;
t is failure time;
C is the scale parameter that is supplied by the supplier or determined through testing; and
β is the life value.
Thus, to find the life value the above equation resolves to:

$$\beta=\ln\{-\ln[-1-F(t)]\}/[\ln(t)-\ln(C)]$$

After the life value is calculated, the life value is compared to a threshold value in step 530. In the first exemplary embodiment, the threshold value may be a specified number of failures in a given time period. In the embodiment using the Weibull distribution, the threshold value is one (1). In step 540, controller 305 determines whether the life value is within specified criteria in comparison to the threshold value. In the first exemplary embodiment, the criteria is whether the life value is greater than the threshold value. In the embodiment using a Weibull distribution, the criteria is whether the life value is greater than one.

If the life value does not meet the criteria, process 500 repeats from step 505. Otherwise, if the life value meets the criteria, system controller schedules maintenance or maintenance of the component in step 545. This scheduled service may then be e-mailed to an administrator, added to a scheduling database, or in some other way brought to the attention of an administrator. Process 500 then may either repeat from step 505 or end.

Figure 7:
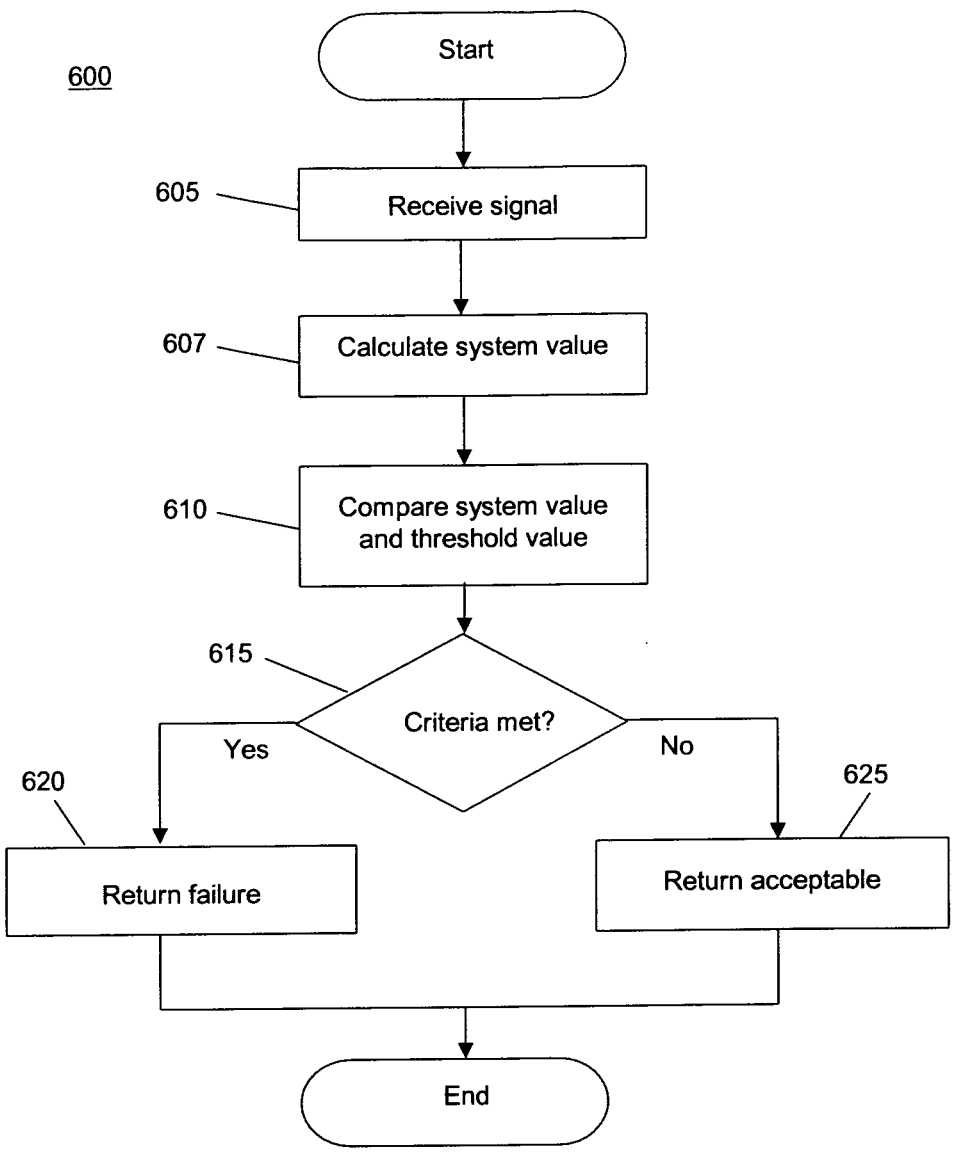
FIG. 7 illustrating a flow diagram of an exemplary embodiment of a process for detecting a failure of a component in a control system in accordance with this invention.

FIG. 7 illustrates an exemplary embodiment of one possible process for detecting a failure of a component. The precise manner of component failure detection is beyond the scope of this invention and it is envisioned any manner of component failure detection may be used.

Process 600 begins in step 605 with system controller 305 receiving a signal from each of the wind turbines 310. In some embodiments, the signal may be simple failure signal or a message indicating failure of the component. In other embodiments, the signal may be a message including data for a property measured by the monitor. The protocol in which signal and/or data is transmitted over connection 315 is not important to this invention and is left as a design choice.

The signal is generated from data detected by monitoring devices that measure a property of either the wind turbine, a component of the wind turbine, or a sub-component of the component of the wind turbine. This property can be used to determine the condition of the component to indicate a failure of the component. Some examples of a property, include but are not limited to an input rate, output rate, operating temperature, and operating pressure. The exact nature of the signal and the information transmitted via the signal are not required to understand this invention and is left as a design choice.

A system value of the measured property is then determined from the received signals in step 607. After the system value is determined, the system value is compared to a system threshold value in step 610. In step 615, the controller then determines whether the system value meets specified criteria in comparison to the system threshold value. These criteria, depending on the property, may be whether the system value is either greater than or less than the system threshold value. If the system value meets the criteria, a failure message is returned in step 620. Otherwise, if the criteria is not met, an acceptance message is returned in step 625. Process 600 then ends.

The following example illustrates the operation of a supervision system in accordance with this invention. For purposes of this example, population 300 (FIG. 3) includes 50 wind turbines 310. A converter system in each wind turbine 310 includes 9 Insulated Gate Bi-Polar Transistors (IGBT)s. Thus, there are 450 IGBTs in population 300.

The supervision system begins operation at the time population 300 is installed and becomes operational. Each wind turbine is then inspected. When an IGBT is found to have failed, a technician reports the failure of the IGBT to a system operator. The system operator indicates a failure by inputting the time and date of the failure is recorded. The system receives the inputted indication of a failure. The system uses the Weibull distribution as described above to calculate a life value. The life value is then calculated from the time of the failure. The life value is then compared to the threshold value of 1. If the life value is equal to 1, the IGBTs are not in a wear-out period and operation of population 300 continues as normal. However, if the life value is greater than one, the IGBT are in the wear-out period. Thus, the system schedules a maintenance of all IGBTs in the wind turbines 310 of population 300. Maintenance is then performed on each of the IGBTs in each wind turbine 310 preventing the IGBTS from entering the wear-down period.

The above is a detailed description of exemplary embodiments of a supervision system in accordance with this invention. It is envisioned that those skilled in the art can and will design alternative systems that infringe on this invention as set forth in the following claims.

What is claimed is:

1. A method for scheduling maintenance of a component in each of a plurality of wind turbines in a population comprising:
    receiving, at a wind turbine controller, an indication that said component in one of said plurality of wind turbines has failed, wherein said failure requires at least one of maintenance and replacement of said component;
    calculating, using the wind turbine controller, a life value in response to receiving said indication of said failure, wherein said life value quantifies a life cycle of said component, and wherein said life value is derived from a cumulative number of failures of said component over a period of time;
    comparing said life value to a threshold value, wherein said threshold value quantifies a maintenance or replacement point in the life cycle of said component, and wherein said threshold value is derived from a predetermined number of failures of said component in said plurality of wind turbines over a predetermined period of time; and
    scheduling maintenance of said component in each of said plurality of wind turbines in said population in response to said life value exceeding said threshold value.

2. The method of claim 1 further comprising:
    receiving a signal from each of said plurality of wind turbines;
    determining a failure of a component occurred in one of said plurality of wind turbines based upon said signal received from said one of said plurality of wind turbines; and
    indicating said failure responsive to a determination of said failure.

3. The method of claim 2 wherein said step of determining said failure comprises:
    determining a system value from said signal received from said one of said plurality of wind turbines.

4. The method of claim 3 wherein said step of determining said failure comprises:
    comparing said system value to a system threshold value; and
    determining a failure of said component in said one of said plurality of wind turbines responsive to said system value being within a specified criteria compared to said system threshold value.

5. The method of claim 2 wherein said step of determining said failure comprises:
    determining a parameter of said one of said plurality of wind turbines from said signal;
    comparing said parameter to a parameter threshold value; and
    determining a failure in said component responsive to said parameter being within a specified test parameter compared to said threshold value.

6. The method of claim 2 wherein said step of determining said failure comprises:
    determining a parameter of said component in said one of said plurality of wind turbines from said signal;
    comparing said parameter to a parameter threshold value; and
    determining a failure in said component responsive to said parameter being within a specified test parameter compared to said threshold value.

7. The method of claim 2 wherein said step of determining said failure comprises:
    determining a parameter of a sub-component of said component in said one of said plurality of wind turbines from said signal;
    comparing said parameter to a parameter threshold value; and
    determining a failure in said component responsive to said parameter being within a specified test parameter compared to said threshold value.

8. The method of claim 1 further comprising:
    storing indicia of said failure of said component in said one of said plurality of wind turbines in a record for said one of said plurality of wind turbines in a database storing information about each of said plurality of wind turbines in said population.

9. The method of claim 1 wherein said calculating of said life value comprises:
    using a Weibull distribution to calculate said life value.

10. The method of claim 9 wherein two variables in said Weibull distribution are a cumulative number of failures and a real time of said failure.

11. The method of claim 10 wherein said Weibull distribution further uses a component constant.

12. The method of claim 11 further comprising:
    storing an indicia of said failure in said one of said plurality of wind turbines in a record of said one of said plurality of wind turbines in a database storing information about each of said plurality of wind turbines in said population; and modifying said component constant based upon records stored for each of said plurality of wind turbines.

13. A computer-readable, non-transitory medium for scheduling maintenance of a component in each of a plurality of wind turbines in a population comprising:

the media comprising computer code configured to:

receive an indication that said component in one of said plurality of wind turbines has failed, wherein said failure requires at least one of maintenance and replacement of said component;

calculate a life value in response to receiving said indication of said failure, wherein said life value quantifies a life cycle of said component, and wherein said life value is derived from a cumulative number of failures over a period of time;

compare said life value to a threshold value, wherein said threshold value quantifies a maintenance or replacement point in the life cycle of said component, and wherein said threshold value is derived from a predetermined number of failures of said component in said plurality of wind turbines over a predetermined period of time; and schedule maintenance of said component in each of said plurality of wind turbines in said population in response to said life value exceeding said threshold value.

14. The computer-readable medium of claim 13 further comprising computer code configured to:

receive a signal from each of said plurality of wind turbines;

detect a failure in a component in one of said plurality of wind turbines; and generate an indication of said failure in response to detecting said failure.

15. The product of claim 14 further comprising computer code configured to:

determine a system value from said signal received from said one of said plurality of wind turbines.

16. The computer-readable medium of claim 15 further comprising computer code configured to:

compare said system value to a system threshold value, and determine a failure of said component in said one of said plurality of wind turbines responsive to said system value being within a specified criteria compared to said system threshold value.

17. The computer-readable medium of claim 14 further comprising computer code configured to:

determine said signal a parameter of said component in said one of said plurality of wind turbines from said signal, compare said parameter to a parameter threshold value, and determine a failure in said component responsive to said parameter being within a specified test parameter compared to said threshold value.

18. The computer-readable medium of claim 14 further comprising computer code configured to:

determine a parameter of a sub-component of said component in said-one of said plurality of wind turbines from said signal, compare said parameter to a parameter threshold value, and determine a failure in said component responsive to said parameter being within a specified test parameter compared to said threshold value.

19. The computer-readable medium of claim 14 further comprising computer code configured to:

store an indicia of said failure of said component in said one of said plurality of wind turbines in a record for said one of said plurality of wind turbines in a database storing information about each of said plurality of wind turbines in said population.

20. The computer-readable medium of claim 14 further comprising computer code configured to:

determine a parameter of said one of said plurality of wind turbines from said signal, compare said parameter to a parameter threshold value, and determine a failure in said component responsive to said parameter being within a specified test parameter compared to said threshold value.

21. The computer-readable medium of claim 13 wherein calculating life value further comprises using a Weibull distribution.

22. The computer-readable medium of claim 21 wherein two variables in said Weibull distribution are a cumulative number of failures and a real time of said failure.

23. The computer-readable medium of claim 22 wherein said Weibull distribution further uses a component constant.

24. The computer-readable medium of claim 23 further comprising computer code configured to:

store an indicia of said failure in said one of said plurality of wind turbines in a record of said one of said plurality of wind turbines in a database storing information about each of said plurality of wind turbines in said population, and modify said component constant based upon records stored for each of said plurality of wind turbines.

25. An apparatus for scheduling maintenance of a component in each of a plurality of wind turbines in a population comprising:

a communication interface configured to receive an indication that said component in one of said plurality of wind turbines has failed, wherein said failure requires at least one of maintenance and replacement of said component;

a processing unit configured to:

calculate a life value in response to detecting said failure, wherein said life value quantifies a life cycle of said component, wherein said life value is derived from a cumulative number of failures over a period of time;

compare said life value to a threshold value, wherein said threshold value quantifies a maintenance or replacement point in the life cycle of said component, and wherein said threshold value is derived from a predetermined number of failures of said component in said plurality of wind turbines over a predetermined period of time; and a scheduler configured to schedule maintenance of said component in each of said plurality of wind turbines in said population in response to said life value exceeding said threshold value.

26. The apparatus of claim 25 wherein the communication interface is configured to receive a signal from each of said plurality of wind turbines and the processing unit is configured to:
- determine that a failure of a component occurred in one of said plurality of wind turbines based upon said signal received from said one of said plurality of wind turbines, and
- indicate said failure responsive to a determination.

27. The apparatus of claim 26 wherein the processing unit is configured to determine a system value from said signal from said one of said plurality of said wind turbines.

28. The apparatus of claim 27 wherein the processing unit is configured to:
- compare said system value to a system threshold value; and
- determine a failure of said component in said one of said plurality of wind turbines responsive to said system value being within a specified criteria compared to said system threshold value.

29. The apparatus of claim 26 wherein the processing unit is configured to:
- determine a parameter of said one of said plurality of wind turbines from said signal;
- compare said parameter to a parameter threshold value; and
- determine a failure in said component responsive to said parameter being within a specified test parameter compared to said threshold value.

30. The apparatus of claim 26 wherein the processing unit is configured to:
- determine a parameter of said component in said one of said plurality of wind turbines from said signal;
- compare said parameter to a parameter threshold value; and
- determine a failure in said component responsive to said parameter being within a specified test parameter compared to said threshold value.

31. The apparatus of claim 26 wherein the processing unit is configured to:
- determine a parameter of a sub-component of said component in said one of said plurality of wind turbines from said signal;
- compare said parameter to a parameter threshold value; and
- determine a failure in said component responsive to said parameter being within a specified test parameter compared to said threshold value.

32. The apparatus of claim 25 wherein the processing unit is configured to store indicia of said failure of said component in said one of said plurality of wind turbines in a record for said one of said plurality of wind turbines in a database storing information about each of said plurality of wind turbines in said population.

33. The apparatus of claim 25 wherein the processing unit is configured to calculate the life value using a Weibull distribution.

34. The apparatus of claim 33 wherein two variables in said Weibull distribution are a cumulative number of failures and a real time of said failure.

35. The apparatus of claim 34 wherein said Weibull distribution further uses a component constant.

36. The apparatus of claim 35 wherein the processing unit is configured to:
- store an indicia of said failure in said one of said plurality of wind turbines in a record of said one of said plurality of wind turbines in a database storing information about each of said plurality of wind turbines in said population, and
- modify said component constant based upon records stored for each of said plurality of wind turbines.

* * * * *